Dec. 4, 1928.
H. F. WAITE
1,694,151
RECTIFYING SYSTEM
Filed July 16, 1926
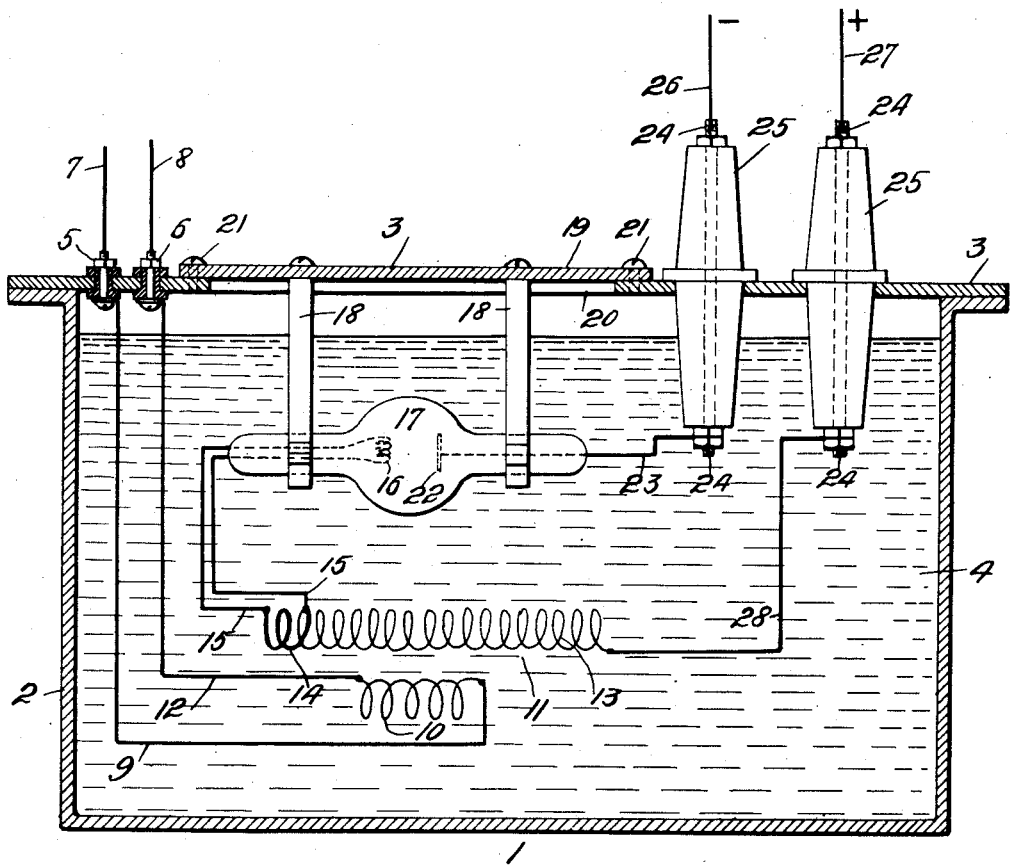
INVENTOR
HARRY F. WAITE
BY
O. Ellery Edwards
ATTORNEY Patented Dec. 4, 1928.

1,694,151

UNITED STATES PATENT OFFICE.

HARRY F. WAITE, OF NEW YORK, N. Y.

RECTIFYING SYSTEM.

Application filed July 16, 1926. Serial No. 122,791.

The object of my invention is to provide a rectifying system which will receive an alternating current and deliver a pulsating uni-directional current. This object is accomplished by my invention, one embodiment of which is hereinafter more particularly disclosed.

For a more detailed description of my invention, reference is to be had to the accompanying drawing, forming a part hereof, in which the figure is a sectional view showing one embodiment of my invention.

My improved rectifier 1 has a tank 2 with a cover 3, held by any suitable means, not shown, as by bolts or screws, and in this tank is oil 4 which rises to near the top and covers the elements hereinafter mentioned. The cover 3 has two carefully insulated binding posts 5 and 6 which are insulated from the cover and from each other and these posts receive the wires 7 and 8 respectively, which supply the alternating current to the apparatus. The post 5 has a wire 9 which runs to the primary coil 10 of the transformer 11 and this primary coil 10 also has another lead wire 12 which runs to the binding post 6. These wires and this primary supply energy to the apparatus. The secondary 13 of the transformer 11 has a few turns of coarse wire 14 which are connected by corresponding conductors 15 to the hot cathode filament 16 of a kenotron 17 which is supported by suitable supports 18 from the cover 3 and preferably from a plate 19 which rests over an opening 20 in this cover and is secured to the cover by means of screws 21.

The anode 22 of the kenotron 17 has a lead wire 23 which runs to a conductor 24 which passes through an insulator 25 to the negative wire 26 and a second insulator 25 has a conductor 24 which at its upper end is connected to the positive wire 27 and, at its lower end where it is immersed, is connected to a wire 28 that connects it with the secondary 13, as shown.

In view of the foregoing, the operation of my improved device will be readily understood. An alternating current is supplied to the wires 7 and 8 and this goes, in the usual manner, to the primary 10 of the transformer 11 and energizes the same. An induced current is set up in the secondary 13 both in the principal winding and in the step down winding 14. The induced current causes the cathode 16 to glow, in the usual manner in the kenotron 17, and as soon as this occurs a high potential current passes through the kenotron in one direction only, that is from the anode 22 to the cathode 16 and the current will flow, as indiacted, through the external circuit, not shown. This may be continued indefinitely because the oil 4 acts not only as an insulator, but also as a cooling medium for the parts which are immersed in it, and so, under normal conditions, the device can operate indefinitely.

It is obvious that by adding more kenotrons, it would be possible to utilize both waves of the alternating current with a corresponding increase in the output. It is also obvious that the exact form of transformer is not the essence of this invention as any suitable transformer may be used, including such as have two primaries which is desirable when the cathode filament is to be subjected to regulation. However, the simplest form of apparatus is the form shown.

In view of the foregoing, the advantages of my apparatus will be readily understood. In addition to the cooling and insulating features, above described, the kenotron is at all times protected and the parts are free of dust and other contaminating influences and the unit is a self contained one which can be operated indefinitely and is free from atmospheric disturbances and all liability to puncturing of the kenotron tubes.

While I have shown and described one embodiment of my invention, it is obvious that it is not restricted thereto, but that it is broad enough to cover all structures that come within the scope of the annexed claims.

Having thus described my invention, what I claim is:

1. A high tension current rectifying device, comprising a tank with oil therein, a high tension step up transformer in said oil, a hot cathode valve tube in said oil, wires connecting said transformer and tube, so that a low potential alternating current may be supplied to said device and a high tension, unidirectional current withdrawn from the same and means by which said tube may be separately removed.

2. A high tension current rectifying device, comprising a tank with oil therein, a cover for said tank, a high tension step up transformer in said oil, a hot cathode valve tube in said oil, wires connecting said transformer and tube so that a low potential alternating current may be supplied to said device and a high tension, unidirectional current withdrawn from the same and a second cover carried by said first mentioned cover for supporting said tube.

3. A high tension current rectifying device, comprising a tank with oil therein, a high tension step up transformer in said oil, a hot cathode valve tube in said oil, wires connecting said transformer and tube, so that a low potential alternating current may be supplied to said device and a high tension, unidirectional current withdrawn from the same, means by which said tube may be separately removed and means for heating the filament of said tube also immersed in said oil.

4. A high tension current rectifying device, comprising a tank with oil therein, a cover for said tank, a high tension step up transformer in said oil, a hot cathode valve tube in said oil, wires connecting said transformer and tube so that a low potential alternating current may be supplied to said device and a high tension, unidirectional current withdrawn from the same, a second cover carried by said first mentioned cover for supporting said tube and low tension and high tension terminals attached to said first mentioned cover.

In testimony whereof, I have hereunto set my hand this 14th day of June, 1926.

HARRY F. WAITE.